May 3, 1960     J. C. HOHNE, JR     2,935,674
MOTOR CONTROL
Filed March 17, 1958
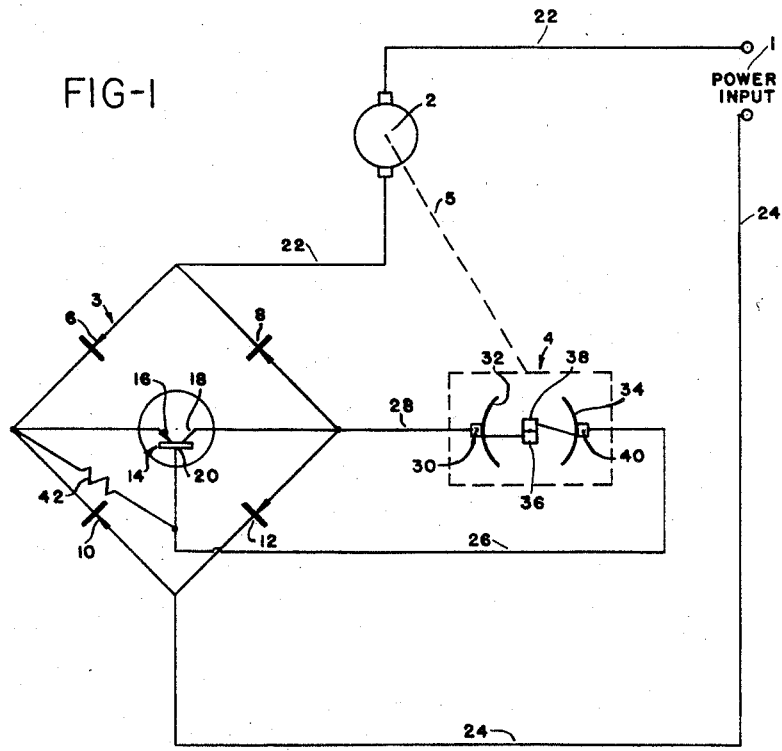
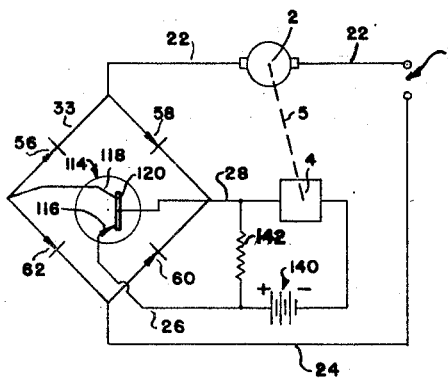
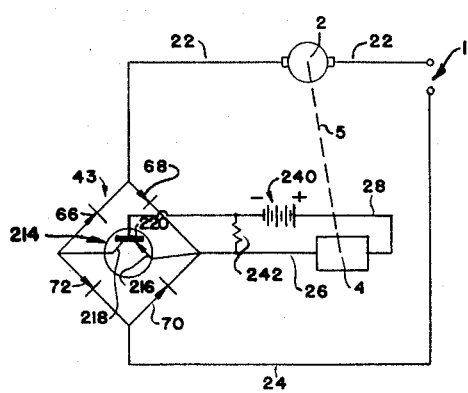
INVENTOR.
JACK C. HOHNE JR.
BY *Milton E. Gilbert*
HIS ATTORNEY United States Patent Office 2,935,674
Patented May 3, 1960

2,935,674
MOTOR CONTROL

Jack C. Hohne, Jr., Tipp City, Ohio, assignor to Globe Industries, Inc., Dayton, Ohio, a corporation of Ohio Application March 17, 1958, Serial No. 721,882

13 Claims. (Cl. 318—293)

This invention relates to improvements in a mechanism for governing the speed of motors. It is more particularly concerned with speed governors for reversible permanent magnet motors in which a pair of contacts serve to control the D.C. power supply to the motor, and also with speed governors for A.C. motors in which a pair of contacts serve to control the A.C. power supply to the motor.

It is one object of the invention to provide a simplified speed control for an A.C. motor or a permanent magnet reversible motor. It is another object of the invention to employ a single transistor in connection with a speed governor to control the speed of an A.C. motor or a permanent magnet reversible motor. Other objects and advantages of the invention will become more readily apparent from a reading of the description following hereinafter, and from an examination of the drawings, in which Figures 1, 2 and 3 are schematic diagrams of the motor power supply circuits illustrating several embodiments of the invention.

The invention contemplates the interposition of a transistor between a motor and its power source. The motor may be an A.C. motor or a permanent magnet motor. However, in order to simplify the discussion thereof, further description will only make reference to a permanent magnet motor. It is believed that one skilled in the art will readily comprehend the applicability of the circuit specifically described hereinafter to an A.C. motor control. The transistor is turned on and off by a pair of governor contacts which are electrically in series with two elements of the transistor. Since the transistor employed in the invention is of the type which will function only if current flow is in a certain direction, the invention contemplates employing a transistor in the diagonal of a bridge circuit which employs rectifiers or other current direction limiting means.

Referring more particularly to Figure 1, a rotational speed governor 4 comprises a pair of substantially semi-circular segments 32 and 34. The segments 32 and 34 are mounted upon the shaft 5 of a motor 2, and are slightly separated one from the other, thus electrically insulating them one from another. These segments 32 and 34 are adapted to be engaged by brushes 30 and 40, respectively in order to transmit current thereto, each brush alternately contacting each segment. Integrally attached or otherwise formed to each segment are flexible resilient members carrying contact members at the end thereof. The segment 32 has attached thereto the flexible finger bearing contact 36; and the segment 34 has integrally attached thereto the resilient finger bearing contact 38. Thus, the segments 32 and 34, and the contacts 36 and 38 serve as a conductor means between the brushes 30 and 40. In such a governor 4, the contacts 36 and 38 are responsive to centrifugal forces, so that when the motor shaft 5 rotates at a speed above a predetermined amount, then the contacts 36 and 38 will separate, thus opening the circuit in lines 26 and 28. The invention is also applicable to governor contacts which are normally out of engagement and which close only at or above the predetermined speed.

The power transistor 14 is interposed between the motor 2 and the power source 1. The transistor 14 comprises a base 20, collector 18 and emitter 16.

The transistor 14 is placed in the diagonal of the bridge 3, which is a rectifier bridge, including the rectifiers 6, 8, 10 and 12 connected as shown in Figure 1. Assuming that the current flow is such that 22 is plus and 24 is minus, then current will flow through line 22, motor 2, rectifier 6, emitter 16, collector 18, rectifier 12, connector 24 and back to the line. When the current flow is in the opposite direction, current will flow through line 24, rectifier 10, emitter 16, collector 18, rectifier 8, line 22, motor 2 and back to the line. Thus, the current flow through the transistor 14 is in the same direction at all times, regardless of the polarity of the input. Therefore, the output circuit of the transistor 14, will control the current to the motor 2, as determined by the control circuit of the transistor 14. This control circuit includes the governor 4, which is in series with the base 20 and collector 18 of the transistor 14. In the arrangement shown, only one transistor need be employed, and by arranging the transistor in the diagonal of the rectifier bridge, current flow is always in the proper direction through the transistor. Also, since there are fewer parts, the complete motor unit will occupy less space and be of less weight than if several transistors were used. Resistor 42 is inserted between the base 20 and the plus side of the bridge. This resistor 42 assures that when the governor contacts are open, that the transistor is turned off. Thus, when the contacts 36 and 38 are open, the base 20 of the transistor will be at the same potential as the emitter 16, because of the resistor 42, which interrupts current flow through the transistor.

Figure 2 shows an alternate arrangement to that shown in Figure 1, with like reference numerals being used for elements which are common to the embodiment of Figure 1. In this embodiment, when line 22 is positive, then current will flow through line 22 through motor 2, rectifier 58, base 120 of the transistor 114, collector 118, rectifier 62, line 24, to the power input source. Conversely, when line 24 is positive, then current will flow through line 24, rectifier 60, base 120, collector 118, rectifier 56, line 22, motor 2 and then to the input source. The rectifier bridge 33 of Figure 2 is similar to the bridge 3 of Figure 1 in that current flow is always caused to be in the same direction through the transistor regardless of the polarity of the input source. The control circuit for the transistor 114 consists of the governor 4 which connects lines 26 and 28 in series with the base 120 and emitter 116. A separate bias source 140 for this control circuit is provided, together with a resistor 142 in parallel with the governor contacts. The resistor 142 functions identically to the resistor 42 in the embodiment of Figure 1.

Still another arrangement of a transistor in a rectifier bridge which will accomplish the purpose of controlling the speed of a reversible motor 2, is shown in Figure 3. The rectifier bridge 43 has the transistor 214 so arranged that the collector 218 and emitter 216 are across the diagonal of the bridge. The arrangement of the bridge circuit is similar to that of Figure 1, with the exception that the resistor 42 has been replaced with a resistor 242 in the control circuit for the transistor 214. Also, a separate bias source 240 is provided in this control circuit. Assuming that line 22 is plus, then current flow will be through line 22, motor 2, rectifier 68, emitter 216, collector 218, rectifier 72, and line 24 back to the input source. If line 24 is plus then the current flow will be through line 24, rectifier 70, emitter 216, collector 218, rectifier 66, line 22, motor 2 and back to the input source.

The control circuit for the transistor 214 includes the governor 4 in series with the base 220 and emitter 216. A separate bias source 240 for this control circuit is provided, together with a resistor 242 in parallel with the governor contacts. The resistor 242 functions identically to the resistor 42 in the embodiment of Figure 1.

While there have been described what are considered to be the preferred embodiments of the invention, it will be readily understood that various changes and modifications will occur to those skilled in the art, which fall within the scope of the appended claims.

What I claim is:

1. A speed control system for a variable speed electric motor including a switching means having a pair of contacts, means for opening and closing said contacts at times related to the speed of the motor, a transistor having base, collector and emitter electrodes, said transistor having the collector electrode and one other of its electrodes connected across the diagonal of a current direction limiting bridge, and said switching means being connected in series with the base electrode and one other electrode of the transistor.

2. A speed control system for a variable speed electric motor including a switching means having a pair of contacts, means for opening and closing said contacts at times related to the speed of the motor, a transistor having base, collector and emitter electrodes, said transistor having the collector and emitter electrodes connected across the diagonal of a current direction limiting bridge, and said switching means being connected in series with the base electrode and the collector electrode of the transistor.

3. The speed control system of claim 2 including a resistor in series with the said base electrode and the plus side of the bridge.

4. A speed control system for a variable speed electric motor including a switching means having a pair of contacts, means for opening and closing said contacts at times related to the speed of the motor, a transistor having base, collector and emitter electrodes, said transistor having the collector and base electrodes connected across the diagonal of a current direction limiting bridge, and said switching means being connected in series with the base electrode and the emitter electrode of the transistor.

5. The speed control system of claim 4 including a source of bias potential for said transistor.

6. The speed control system of claim 5 wherein said source of bias potential is in series with said switching means, said base and emitter electrodes.

7. The speed control system of claim 6 wherein a resistor is connected in parallel with the said base and emitter electrodes.

8. A speed control system for a variable speed electric motor including a switching means having a pair of contacts, means for opening and closing said contacts at times related to the speed of the motor, a transistor having base, collector and emitter electrodes, said transistor having the collector and emitter electrodes connected across the diagonal of a current direction limiting bridge, and said switching means being connected in series with the base electrode and the emitter electrode of the transistor.

9. The speed control system of claim 8 including a source of bias potential for said transistor.

10. The speed control system of claim 9 wherein said source of bias potential is in series with said switching means, said base and emitter electrodes.

11. The speed control system of claim 10 wherein a resistor is connected in parallel with the said base and emitter electrodes.

12. A constant-speed motor system comprising a permanent-magnet reversible motor having a rotatable shaft, a governor switch mounted on said shaft, said switch being caused to open and close in accordance with the motor speed, a reversible polarity voltage source for energizing said motor, a control circuit for connecting said motor to said source, said control circuit including a transistor having base, collector and emitter electrodes, said transistor having the collector electrode and one other of its electrodes connected across the diagonal of a current direction limiting bridge, and said switching means being connected in series with the base electrode and one other electrode of the transistor.

13. The system of claim 12 wherein the current direction limiting bridge consists of rectifiers so connected and arranged that current will flow through the transistor in the same direction regardless of the polarity of the voltage source.

References Cited in the file of this patent

UNITED STATES PATENTS 2,774,021    Ehret _____ Dec. 11, 1956